Dec. 5, 1967  J. R. BARBER ETAL  3,356,301
MOBILE FERTILIZER SPREADER
Filed Nov. 30, 1964  5 Sheets-Sheet 1
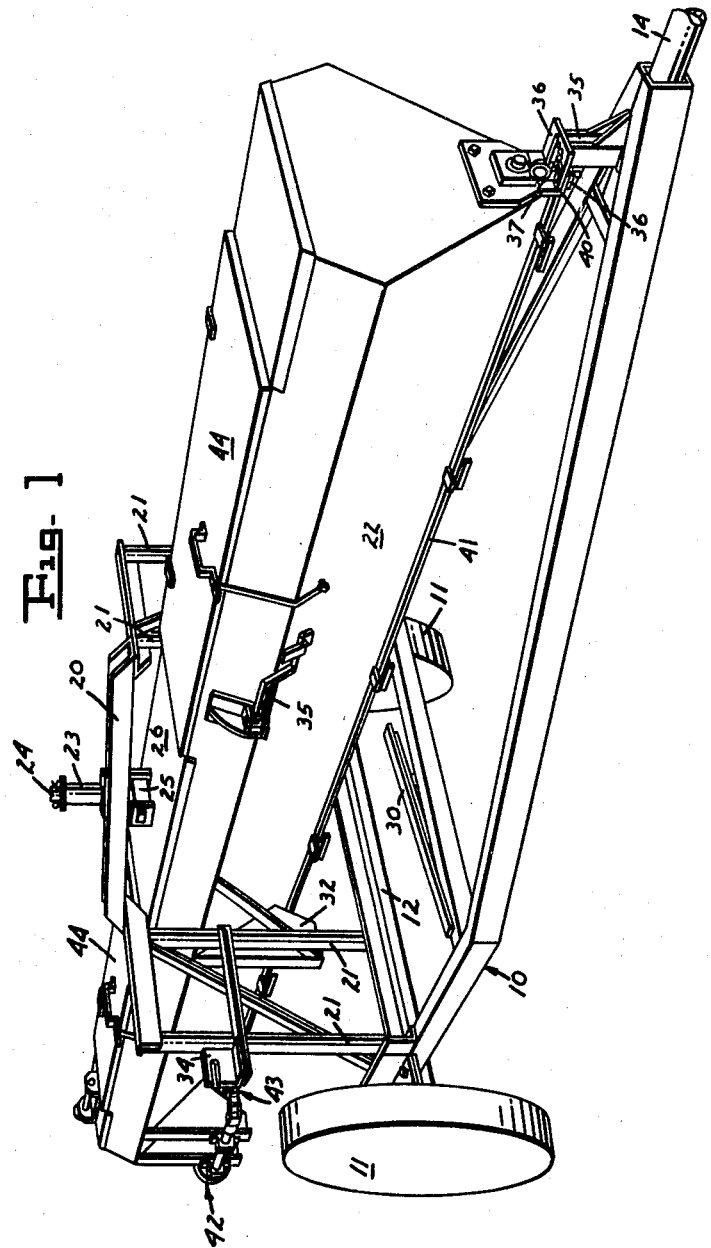
INVENTORS
JAMES R. BARBER
JESSE BARBER
BY
*Wells & St. John*
ATTYS.

Dec. 5, 1967 J. R. BARBER ETAL 3,356,301
MOBILE FERTILIZER SPREADER
Filed Nov. 30, 1964 5 Sheets-Sheet 2
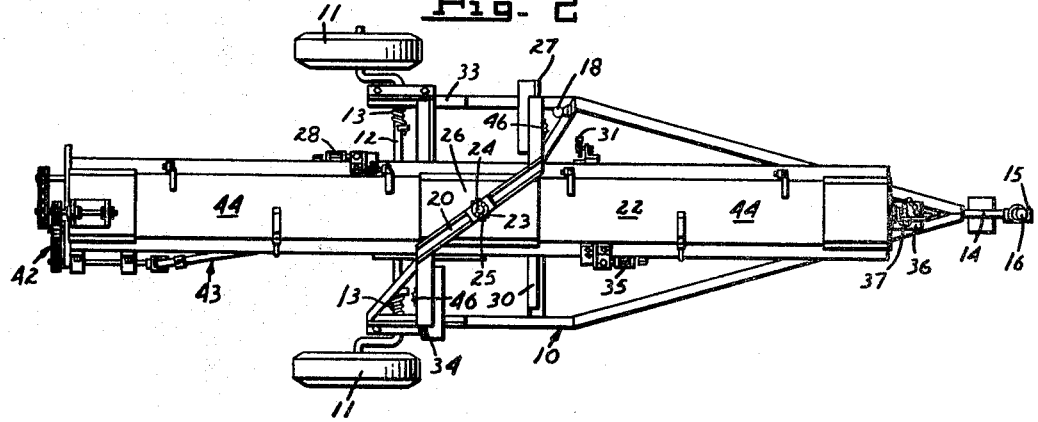
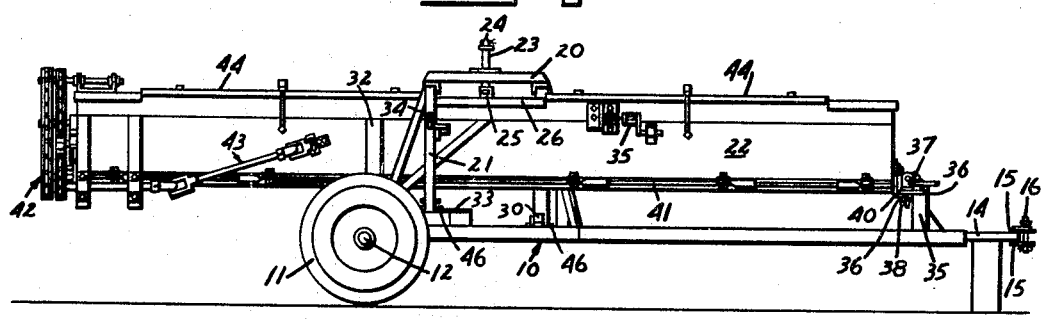
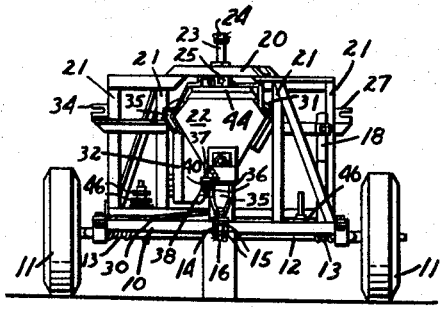
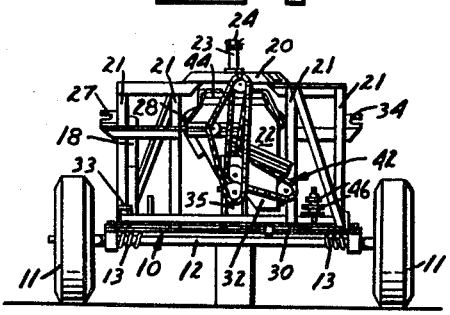
INVENTORS
JAMES R. BARBER
JESSE BARBER
BY
ATTYS.

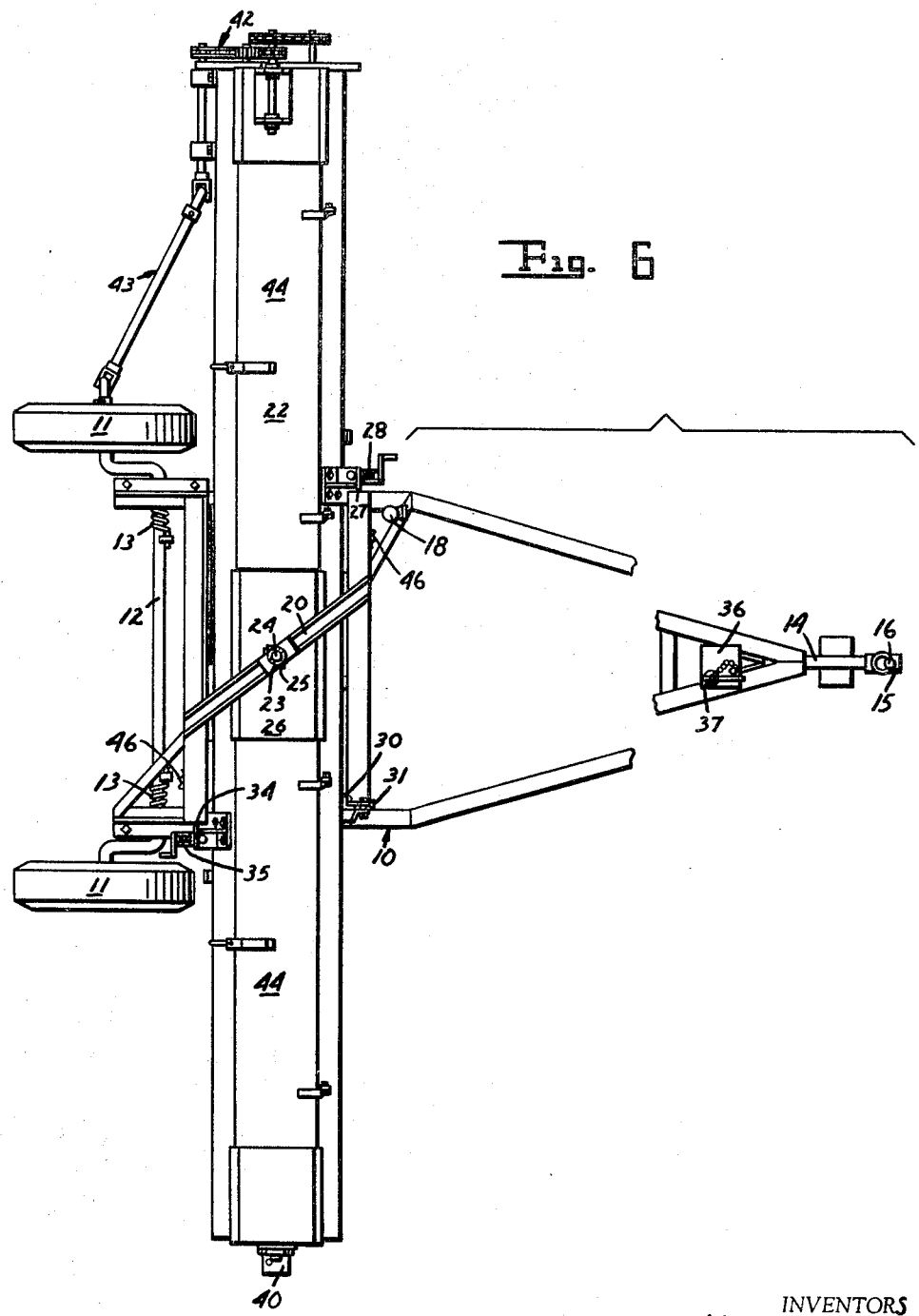

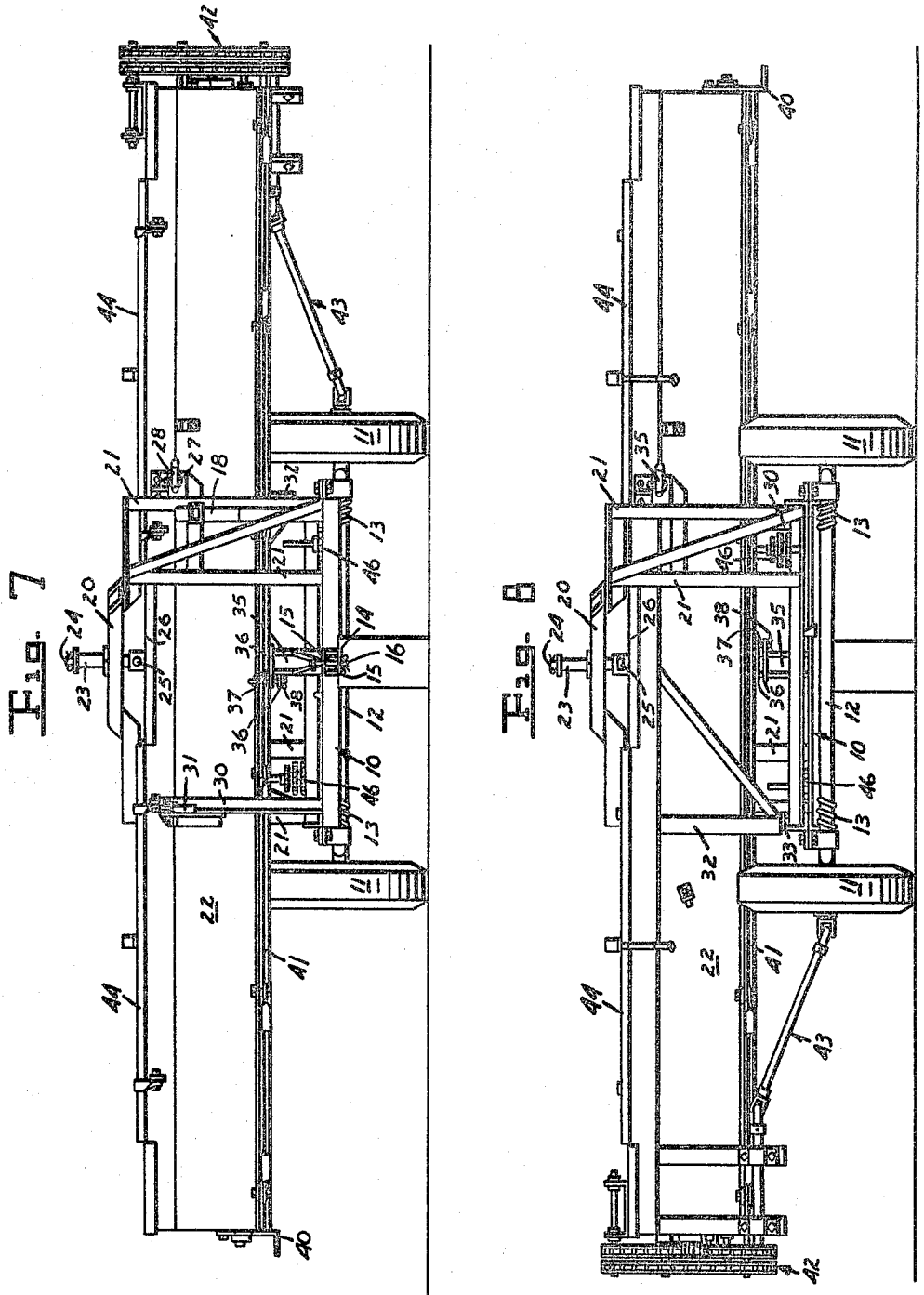

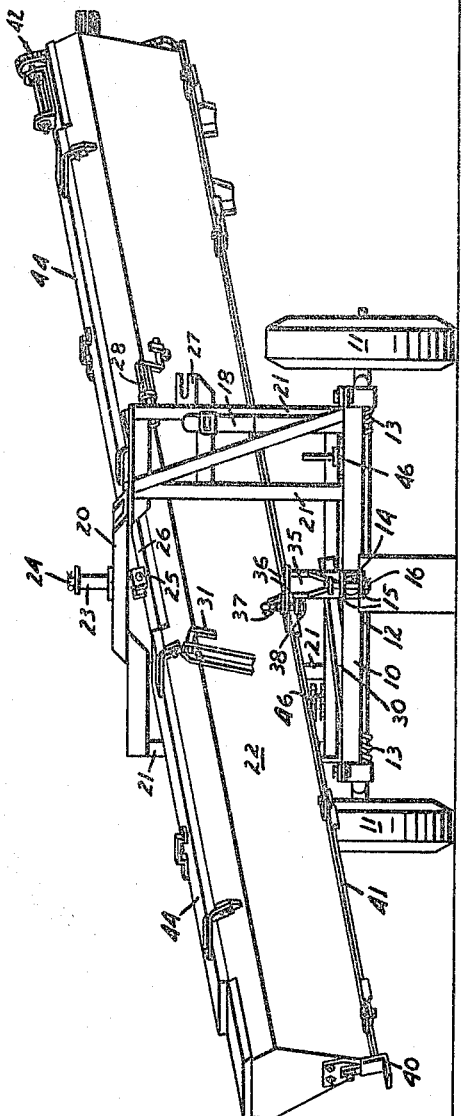

MOBILE FERTILIZER SPREADER

James R. Barber and Jesse Barber, both c/o Barber Engineering, N. 1404 Regal, Spokane, Wash. 99202
Filed Nov. 30, 1964, Ser. No. 414,550
3 Claims. (Cl. 239—664)

This invention relates to a mobile fertilizer spreader for use in fields to apply fertilizer across a limited number of rows.

The present invention provides a novel support for a fertilizer spreader box so that the spreader box can be easily pivoted from a longitudinal travel position to a transverse working position with a minimum of operations required by the user. The spreader is pivoted at its center so as to counterbalance its weight across the support on which it is caried by a mobile frame. In addition, the spreader box is mounted in a relatively low position and is supported so as to selectively clear the frame wheels as it is pivoted about its axis on the frame.

It is a first object of this invention to provide a fertilizer spreader box on a mobile frame for pivotal movement of the box between a longitudinal position and a transverse position.

Another object of this invention is to provide a movable support for a pivoted spreader box carried on a mobile frame and designed so as to evenly balance the weight of the box so that it can be moved with a minimum of effort.

Another object of this invention is to provide a mounting for a spreader box on a mobile frame so that the bax can clear ground engaging wheels on the frame and can be locked in its selected position without special tools or any adjustment.

These and other objects will be evident from a study of the following description, taken together with the accompanying drawings, which illustrate one preferred form of the invention. It is to be undestood at the start that this particular form of the invention is not intended to restrict or limit the scope of the invention itself, which is defined in the appended claims.

In the drawings:

FIGURE 1 is a perspective view of the spreader in its longitudinal or travel position, the forward end of the hitch on the frame being broken away;

FIGURE 2 is a top view of the spreader as seen in FIGURE 1;

FIGURE 3 is a side view taken from the bottom of FIGURE 2;

FIGURE 4 is a front view of the spreader shown in FIGURE 2;

FIGURE 5 is a rear view of the spreader shown in FIGURE 2;

FIGURE 6 is an enlarged top view of the spreader in its working position, a portion of the frame being broken away;

FIGURE 7 is a front view of the spreader as seen in FIGURE 6;

FIGURE 8 is a rear view of the spreader as shown in FIGURE 6; and

FIGURE 9 is a front view of the spreader, similar to FIGURE 7, but showing the spreader box in an intermediate position as it is being moved over one of the wheels.

Pivoted mountings for spreader boxes have been applied previously in the case of rather wide arrangements where two or more boxes are pivoted at their respective ends to swing outwardly to transverse positions for spreading purposes. However, there is a need in smaller applications for a spreader having less width and greater mobility than previously available. The present invention can be used for a relatively small spreader box efficient for fields that cannot support large scale equipment. In addition, the present invention provides great mobility and an easy method of converting the spreader for highway travel as a conventional trailer.

As shown in the drawings, the spreader is mounted on a rigid mobile frame 10 that is carried by a pair of rear ground engaging wheels 11. The wheels 11 are rotatably mounted on an axle 12 having offset ends that are biased by coiled springs 13 to provide limited movement between the frame 10 and the wheel 11.

At the front end of the frame 10 is a forwardly protruding tongue 14 that terminates at a pair of vertically spaced horizontal plates 15. The plates 15 are provided with a releasable vertical pin 16 and serve as the usual hitch for attachment of the tongue 14 for field use. As an alternative, when the frame 10 is to be drawn down a road by a truck or other vehicle, there can be provided a conventional trailer hitch 18 that is normally stored on the frame 10, as shown in FIGURE 9, and which is slidably receivable within the tongue 14. Hitch 18 also can be locked in place by pin 16.

Directly forward of the wheels 11 is a diagonal transverse brace 20 carried on front and rear posts 21. The brace 20 defines an arch of the frame 10 of sufficient width and height to receive a fertilizer spreader box 22, the design of which does not constitute a part of the present invention. The spreader box 22 is supported from the brace 20 by means of a bearing 23 located at the center of the brace 20 and protruding upwardly from it. The bearing 23 rotatably journals a pivot shaft 24 having a cross pivot 25 at the bottom of the shaft 24. The cross pivot 25 is pivotally connected to a plate 26 rigidly secured across the top of the spreader box 22. The box 22 therefore hangs beneath the brace 20 for pivotal movement relative to the brace 20 and frame 10 about a vertical axis and about a horizontal axis transverse to the length of the box 22. The box 22 is supported at its longitudinal center and is therefore evenly balanced relative to the cross pivot 25. The diagonal offset between posts 21 prevents interference with the intended motion of box 22.

The spreader box 22 is selectively positionable between the longitudinal travel position illustrated in FIGURES 1 through 5 and a transverse spreading position illustrated in FIGURES 6 through 8. The spreading position of box 22 is preferably perpendicular to the intended direction of travel of the frame 10 relative to the supporting ground surface.

As shown in FIGURE 1, the box 22, when in its travel position, hangs freely at the rear of the wheels 11 and extends beyond the end of the frame 10. It is supported by the shaft 24 and bearing 23 beneath the brace 20. The only other connection between the box 22 and the frame 10 in this position is at the front end of the box 22, where there is provided a protruding plate 40. The plate 40 fits between a pair of horizontal plates 36 at the top of a short post 35 secured to the frame 10 adjacent to its front end. A pin 37 fits through the plates 36 and 40 and is held in place by a releasable key 38 at its lower end.

The problem encountered in the production of a short pivotable spreader box of this type is to mount it closely adjacent to the ground, and yet use wheels of a diameter great enough to provide sufficient traction and support for the apparatus. This necessitates the placement of the bottom of the box 22 at an elevation beneath the top of the wheels 11. For this reason, the double pivot is provided between the brace 20 and the box 22, so that as the box 22 is swung from a longitudinal position to a transverse position beneath the brace 20, the rear of the box can be tilted upwardly (FIGURE 9) to clear the wheel 11 over which it must pass.

After being located in a position perpendicular to the intended direction of travel of frame 10 (FIGURES 6 through 8) the box 22 must be securely mounted on the frame 10. This is accomplished at four different locations between the frame 10 and the box 22. At the front of the box 22, shown in FIGURE 7, there is provided a clamp 31 that engages an angle iron 30 pivotally carried on the frame 10. The angle iron 30 can be seen in its lowered position in FIGURES 1 and 9, and can be seen in its upright or vertical position in FIGURE 7. Also, movement of spreader box 22 to the transverse position will bring another clamp 28 on the box 22 into engagement with a slotted bracket 27 fixed to the front post 21, seen to the right in FIGURE 7.

As the box 22 reaches the transverse position, a downwardly extending vertical brace 32 at the rear of the box 22 will slide over an abutment 33 at the left of the frame as shown in FIGURE 8. The abutment 33 can also be seen in FIGURES 2 and 3 as it appears when not in engagement with the brace 32. The box 22 is also clamped at its rear side by means of a clamp 35 on the box 22 that engages a slotted bracket 34 on the rear post 21 identical to the previously described bracket 27. The clamps 35 and 28 are simply threaded crank arms pivotally mounted on the spreader box 22 so that they can be swung into engagement with the slots on the respective brackets 34 and 27 when desired. The clamp 31 can be any suitable clamp that is easily releasable to engage one of the sides of the angle iron 30.

As stated before, the details of the spreader box are not critical to this invention. The box is shown with a tapered design leading downwardly to a bottom plate assembly 41. The box is provided with a drive mechanism at one end, generally denoted by the numeral 42. The drive mechanism 42 is powered by means of a universal coupling 43 that can be releasably secured to the adjacent wheel 11 when the box 22 is in its transverse or working position (see FIGURE 6).

The interior of box 22 is not illustrated in the drawings and is hidden by hinged covers 44 at the top of the box 22. There also is provision on the frame 10 for storage of spare sprockets 46 at both sides of the frame. These are simply carried on upright shafts fixed to the frame 10 so as not to interfere with movement of the box 22.

Basically this invention provides a simple balanced support for a spreader box whereby it is carried beneath a diagonal brace that allows the box to be moved between a longitudinal and a transverse position. The box is releasably fixed at either position by simple clamps that can be readily manipulated without special tools or skills. The box is easily rearranged between its two respective positions and provides a versatile tool for use in fields that cannot be adapted to larger scale machinery.

Having thus described our invention, we claim:
1. A mobile fertilizer spreader, comprising:
 a longitudinal frame carried by a pair of transversely aligned ground engaging wheels located at the rear end thereof, the front end of the frame being adapted to be attached to a towing vehicle;
 a spreader box;
 a fixed brace extending diagonally across said frame longitudinally adjacent to said wheels, said brace forming an arch having a width and height sufficient to receive said spreader box beneath it;
 pivot means connecting the brace and top center of the spreader box to pivotally support said spreader box below said brace for pivotal motion about a vertical axis and a horizontal axis transverse to the length of said spreader box;
 and means on said frame selectively engageable with said spreader box to selectively fix the position of said spreader box relative to the frame.

2. A spreader as defined in claim 1 wherein the bottom of the spreader box at its center is at an elevation below the top of said wheels.

3. A mobile fertilizer spreader having a frame carried by a pair of wheels that are mounted along a transverse axis evenly spaced from the longitudinal axis of the spreader, in combination with the improvement of:
 (a) an arch frame mounted to the spreader frame having transversely and longitudinally spaced side posts for supporting a diagonal brace elevated from the spreader frame to form an arch, and
 (b) an elongated unitary spreader box centrally, pivotally and tiltably mounted below the brace longitudinally spaced from the wheel axis so that the box is capable of moving from a first horizontal position parallel with the longitudinal axis to a second horizontal position perpendicular to the longitudinal axis in which the bottom of the box is below the top of the wheels and the ends of the box extend outwardly beyond the wheels.

References Cited

UNITED STATES PATENTS

| | | | |
|---|---|---|---|
| 739,347 | 9/1903 | Rowell | 275—2 |
| 2,929,634 | 3/1960 | Gandrud | 275—2 |

FOREIGN PATENTS

| | | |
|---|---|---|
| 1,249,405 | 11/1960 | France. |
| 345,079 | 12/1921 | Germany. |

ABRAHAM G. STONE, *Primary Examiner.*

J. R. OAKS, *Assistant Examiner.*